(12) United States Patent
Shih

(10) Patent No.: US 6,816,931 B2
(45) Date of Patent: Nov. 9, 2004

(54) UPSTREAM PERIPHERAL DEVICE SERVING AS A USB HOST

(75) Inventor: Po-Sheng Shih, Hsinchu (TW)

(73) Assignee: Avision Inc., Hsinchu (TW)

( * ) Notice: Subject to any disclaimer, the term of this patent is extended or adjusted under 35 U.S.C. 154(b) by 13 days.

(21) Appl. No.: 10/318,175

(22) Filed: Dec. 13, 2002

(65) Prior Publication Data

US 2003/0196011 A1 Oct. 16, 2003

(30) Foreign Application Priority Data

Apr. 10, 2002 (TW) ........................ 91107169 A

(51) Int. Cl.⁷ .................. G06F 13/00; G06F 13/12; G06F 13/14
(52) U.S. Cl. ............... 710/62; 710/8; 710/31; 710/38; 710/72; 710/104; 710/110; 710/305; 710/316; 709/208; 709/209; 709/211
(58) Field of Search .................. 710/2, 8, 15, 16, 710/31, 38, 62–64, 72–74, 300, 302, 104, 305, 313, 316, 110; 709/200, 208–211

(56) References Cited

U.S. PATENT DOCUMENTS

| 5,784,581 A | * | 7/1998 | Hannah | 710/110 |
| 6,636,923 B1 | * | 10/2003 | Meirsman et al. | 710/305 |
| 2002/0161844 A1 | * | 10/2002 | Overtoom | 709/208 |

FOREIGN PATENT DOCUMENTS

CN TW413360 11/2000

* cited by examiner

Primary Examiner—Jeffrey Gaffin
Assistant Examiner—Tanh Q Nguyen
(74) Attorney, Agent, or Firm—Rabin & Berdo, P.C.

(57) ABSTRACT

A scanner, which can be a USB host, includes a hub, a scanner component, a virtual printer component and an internal host. The hub is connected to a computer host and the scanner. The scanner component stores the basic setting data of the scanner, while the virtual printer component stores the basic setting data of a printer, and both the scanner component and the virtual printer component are connected to the hub. The internal host is respectively connected to the scanner component, the virtual printer component and the printer. With the virtual printer component and the internal host, the scanner can be the USB host, which directly controls the printer to print.

15 Claims, 2 Drawing Sheets

UPSTREAM PERIPHERAL DEVICE SERVING AS A USB HOST

This application incorporates by reference of Taiwan application Serial No. 091107169, filed Apr. 10, 2002.

BACKGROUND OF THE INVENTION

1. Field of the Invention

The invention relates in general to a Universal Serial Bus (USB) upstream peripheral device, and more particularly to a scanner that may serve as a USB host.

2. Description of the Related Art

A Universal Serial Bus (USB) is a plug and play interface between a computer and a peripheral device. The USB allows the addition of a new device to the computer without having to add an adapter card or having to shut down the computer. Many kinds of peripheral devices can be connected, configured, used or removed while the computer is still running, and thus the Plug and Play (PnP) function allows the peripheral device to be installed ("plugged in") and used immediately be used ("played with"). Furthermore, the data transfer rate conducted by the USB between the computer host and the peripheral devices is much faster. As a result, the USB is a popular type of interface fitted to most PCs available today.

Figure 1:
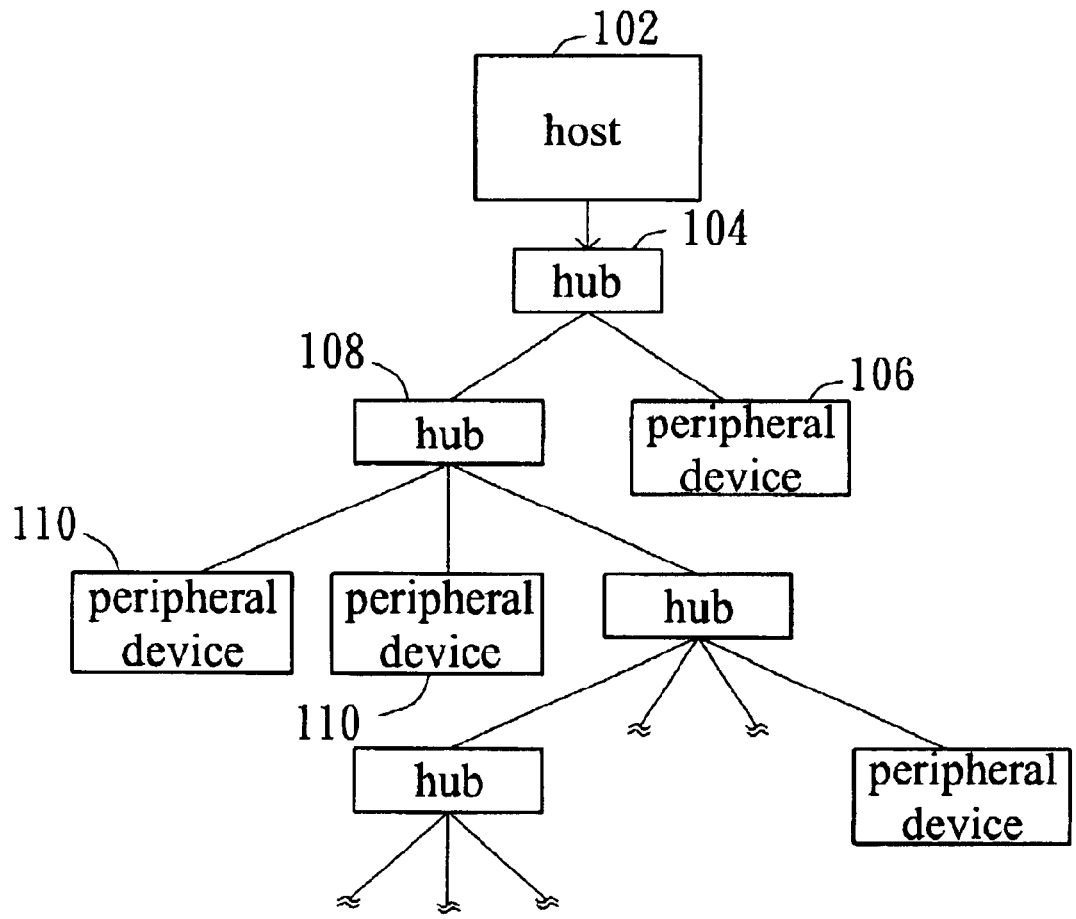

Referring to the FIG. 1, it shows the drawing of the topology of a USB computer host and the peripheral devices. A USB host connects with the peripheral devices through the external hubs. A hub can be either attached directly to the peripheral devices, or attached to another hub, which is connected with the peripherals. The peripheral devices cannot directly interconnect to other peripherals. As shown by the example in FIG. 1, a USB host 102 is connected to the hub 104, which is directly connected to a peripheral device 106, or indirectly connected to the peripheral device 110 via the hub 108. Also, the peripheral device 106 and peripheral device 110 both are not attached to other peripherals. With the USB, the USB host 102, the peripheral device 106, and peripheral device 110 combine to form an information processing system 100, wherein the USB host 102 is the controller of the whole information processing system 100, which controls all operations of the peripheral device 106 and peripheral device 110. In other words, all functionalities of the peripheral device 106 and peripheral device 110 are controlled by the USB host 102.

Figure 2A:
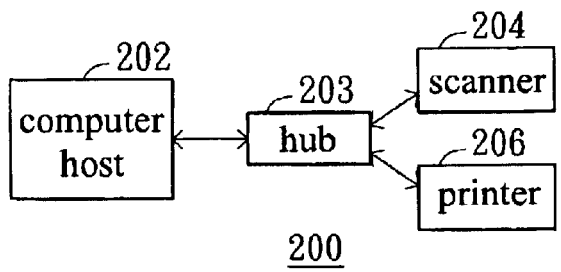
Figure 2B:
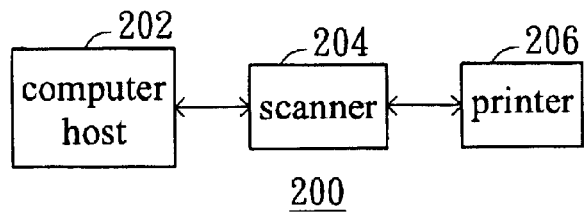

Referring to FIG. 2A and FIG. 2B, they show the manner of interconnection among a conventional USB computer host 202, a scanner 204, and a printer 206. They also show a sort of information processing system 200. In FIG. 2A, the scanner 204 and the printer 206 are connected with the computer host 202 by the hub 203. Hence, the computer host 202 can control the scanner 204 for scanning, and can also transmit the print data to the printer 206 for printing as well. On the other hand, in FIG. 2B, the connecting manner of the computer host 202, the scanner 204 and the printer 206 can adopt not only a conventional USB interface but also an EPP interface as the connecting interface of the information processing system 200. If the information processing system 200 in FIG. 2B applies the EPP interface, the computer host 202 can manipulate the scanner 204 and the printer 206 to work respectively, and also the scanner 204 can directly control the printing function of the printer 206, so as to provide the scan-to-print function.

However, if a USB interface is applied to the connection structure of FIG. 2B, the following method may not be able to provide the scan-to-print function. Here the computer host 202 is connected to the scanner 204, and the scanner 204 is connected to the printer 206. The computer host 202 is connected to a hub, which is configured inside the scanner 204. For the purpose of clarity, in FIG. 2B, the hub inside the scanner 204 is not shown. The internal hub is connected with the scanner 204, and also provides another USB port to be connected with the printer 206. In the information processing system 200, the computer host 202 is the USB host, and the scanner 204 and the printer 206 are the peripheral devices. Under the control of the computer host 202, the scanner 204 and the printer 206 can perform the instructions of the computer host 202 respectively.

The scan-to-print function enables the image data to be scanned by the scanner and then printed by the printer immediately. It is becoming one of the convenient functions needed for performing information processing. However, if the computer host 202 applies a USB interface to connect with the scanner 204 and the printer 206, the scanner 204 and the printer 206 operate under the control of the computer host 202 because the computer host 202 is the only controller of the whole information processing system 200. The scanner 204 is a peripheral device and cannot replace the computer host 202 as the USB host to control the printer to print directly. Therefore, according to the structure of the FIG. 2B, the scanner 204 cannot transmit the scanned document to be printed by the printer 206 directly.

SUMMARY OF THE INVENTION

It is therefore an object of the invention to provide a scanner, which can be a virtual USB host to directly control a printer to print without going through an external host.

Accordingly, the object of the present invention is to provide the scanner capable of serving as a USB host. The scanner is connected with a computer host and a printer respectively, wherein the computer host is a USB host. The scanner includes a hub, a scanner component, a virtual printer component and an internal host. The computer host and scanner are both connected to the hub for transferring data from the computer host to the scanner and vice versa. The scanner component stores the initial setting data of the scanner. In addition, the virtual printer component is connected with the hub, so as to output data to the hub and receive data output by the hub. The virtual printer component stores the initial setting data of the printer. Furthermore, the internal host is connected respectively with the scanner component, the virtual printer component and the printer, so as to output data from the printer to the virtual printer component, and also output data respectively from the scanner component and the virtual printer component to the printer. With the virtual printer component and the internal host, the scanner can be the USB host, which can directly control the printer to print.

According to a preferred embodiment of the invention, the scanner provides the function of a USB host, by enabling the scanned image data to be directly transmitted to the printer for printing without being under the control of the computer host.

Other objects, features, and advantages of the invention will become apparent from the following detailed description of the preferred but non-limiting embodiment. The following description is made with reference to the accompanying drawings.

BRIEF DESCRIPTION OF THE DRAWINGS (Prior art) FIG. 1 shows the drawing of the topology of a USB computer host and the peripheral devices.

(Prior art) FIG. 2A and FIG. 2B show the interconnection manner of a conventional USB computer host with a scanner and a printer.

Figure 3:
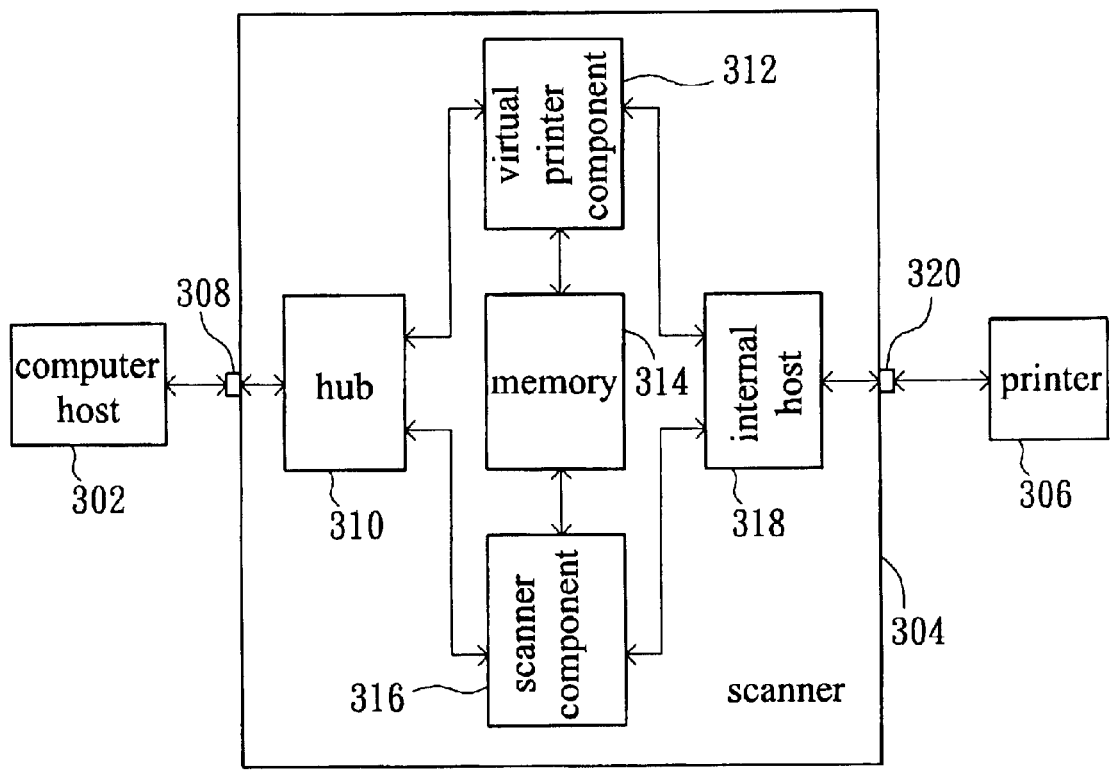

FIG. 3 shows a diagram of the interconnections of the interior components of a scanner capable of providing the USB host function, according to one preferred embodiment of the present invention.

DETAILED DESCRIPTION OF THE INVENTION

For simplicity and clarity, the following description of the preferred embodiment takes a scanner as an example of the upstream peripheral devices.

The invention features the scanner as the upstream peripheral device capable of the function of a virtual USB host, which can directly transmit the processed, scanned image data to a downstream peripheral device, such as a printer for printing without being under the control of a computer host.

Referring to the FIG. 3, the diagram shows the interconnection of the interior components of a scanner capable of the USB host function of the present invention. A scanner 304 is connected with a computer host 302 by a USB upstream input port 308 and also connected with a printer 306 by a USB downstream output port 320, wherein the scanner 304 represents an upstream peripheral device; the computer 302 is an external host; and the printer 306 is a downstream peripheral device. In the USB information processing system, the computer host 302 is a USB host; the scanner 304 and the printer 306 respectively represent the upstream peripheral device and downstream peripheral device. The scanner 304 further includes a virtual printer component 312 representing a virtual downstream peripheral component, a scanner component 316 representing an upstream peripheral component, a memory 314 and an internal USB host 318 or an internal host 318. A USB hub 310 connecting the computer host 302 with the scanner 304 is able to be configured within the computer host 302, or between the computer host 302 and the scanner 304, or within the scanner 304. In the example of the preferred embodiment, the USB hub 310 is configured within the scanner 304, however, the invention is not limited to the example. In addition, the virtual printer component 312 and scanner component 316 are both connected with the USB hub 310 and the internal host 318. The memory 314 can be a SDRAM connected with the virtual printer component 312 and the scanner component 316, respectively, for storing the instructions and data when operating the information processing system.

When the power of the USB host of the information processing system is switched on, the USB host will initialize the settings of the connected and booted peripheral devices, and each booted peripheral device will transmit the basic setting data to the USB host via the hub. With those basic setting data, the USB host can acquire the number of connected peripheral devices of the whole information processing system, and also acquire the type and the model of each peripheral device and the relative connecting relation of the peripheral devices. During operation, if another peripheral device is added and connected to the system, the computer host will initialize the setting of the new peripheral device via the connected hub.

In the example of the preferred embodiment, when the power for the computer host 302 and the scanner 304 is turned on, the computer host 302 will initialize the settings of the scanner 304 via the hub 310, and the basic setting data of the scanner 304 is stored in the scanner component 316.

When operating the initialization settings, the computer host 302 will retrieve the basic setting data of the scanner 304 from the scanner component 316 via the hub 310. Also, the virtual printer component 312 of the scanner 304 stores the basic setting data of the printer 306. When the printer 306 is disconnected from the scanner 304 or the power of the printer 306 is off, the virtual printer component 312 of the scanner 304 is set at a disabled state. Thus, the computer host 302 will not retrieve the basic setting data of the printer 306 from the virtual printer component 312 when initializing the settings, and the printer 306 is identified as disconnected from the information processing system. When the power of the printer 306 is on or the printer 306 is connected to the scanner 304 in a manner of hot swap, the virtual printer component 312 will be set at an enabled state, and then the computer host 302 can retrieve the basic setting data of the printer 306 from the virtual printer component 312. At this moment the computer host 302 will recognize that the information processing system include the printer 306. It is noteworthy that the virtual printer component 312 is used to be recognized by the computer host 302 that the printer 306 is directly connected with the computer host 302. In other words, when the computer host 302 retrieves the basic setting data of the printer 306 from the virtual printer component 312, the computer host 302 recognizes that the connection with the printer 306 and the connection with the scanner 304 both are directly connected to the computer host 302 through the hub 310. Therefore the identification of the computer host 302 is actually not as shown in the FIG. 3, wherein the printer 306 is indirectly connected to the computer host 302 via the scanner 304.

When the printer 306 wants to print data stored in the computer host 302, the virtual printer component 312 is first set at a preparation state. Afterwards, the computer host 302 transmits the control instructions of the printer 306 and the awaiting data to the printer 306 through the hub 310, the virtual printer component 312 and the internal host 318 sequentially. When the virtual printer component 312 receives the host instructions and the host data, the virtual printer component 312 outputs an Acknowledgement (ACK) signal to confirm the transmission of the host instructions and host data to the computer host 302. Those host instructions and host data are temporarily stored in the memory 314, and then transmitted to the printer 306. According to the host instructions, the printer 306 prints the awaiting host data. The output signal of the printer 306 will also be transmitted to the computer host 302 through the internal host 318, the virtual printer component 312 and the hub 310 sequentially. In the entire process, the printer 306 is the peripheral device that receives the instruction of the computer host 302.

For the next example, the scanner 304 can directly instruct the printer 306 to print the processed, scanned data of the scanner 304 without going through the control of the computer host 302. The first step is to set the virtual printer component 312 at a busy state. Meanwhile, if the computer host 302 also needs to use the printer 306, the computer host 302 will recognize the printer 306 as currently occupied by other jobs, according to the busy state of the virtual printer component 312. Thus, the computer host 302 will postpone the control of the printer 306 to print. Simultaneously, by the internal host 318, the scanner 304 can be the virtual USB host and can control the operation of the peripheral device of the printer 306. The scanner 304 will transmit the instructions and the awaiting scanned data through the internal host 318 to the printer 306. When the printer 306 receives the scanner instructions and the scanned data, it will output an ACK signal to the scanner 304 to confirm the transmission of the scanner instructions and the scanned data. Then the printer 306 prints the awaiting scanned data according to the scanner instructions. The signal to be output from the printer 306 will also be transmitted to the scanner component 316 through the internal host 318. In the entire process, the printer 306 is the peripheral device of the scanner 304 that receives the instructions of the USB host of the scanner 304. When the printer 306 finishes the operation of directly printing, the virtual printer component 312 will recover to the original preparation state. At this time the computer host 302 will be able to use the printer 306 to print data. Thus, in this example, the scanner 304 of the invention serves not only as a peripheral device, but also as the USB host, by providing with the virtual USB function.

In practical application, before acquiring the scanner 304, the computer host 302 is directly connected to the printer 306. After acquiring the scanner 304 of the invention, the scanner 304 only needs to be connected between the printer 306 and the computer host 302, so as to provide the functions of printing, scanning, and scan-to-printing, and so on. Therefore, the scanner 304 of the invention is very convenient to use.

It is noted that the invention is not limited to the configuration that the scanner 304 must be directly connected with the computer host 302, and the printer 306 must be indirectly connected with the computer host 302 through other devices. The scanner, the printer and other USB peripheral devices which are directly connected to the computer host 302 or indirectly connected to the computer host 302 by the hub, such as a digit camera, a CD-RW drive, a personal digit assistant (PDA) and so on, for those including the virtual USB host functionality and settings are within the scope of this invention.

For example, with the connection manner of a computer host—a digital camera—a printer, the computer host can control the digital camera and the printer, and moreover, the digital camera can directly control the operation of the printer. For another example, with the connection of a PDA—a scanner—a CD-RW drive, the PDA can control the operation of the scanner and the CD-RW drive, and the scanner can directly output the data to be saved to the CD-RW drive as a backup.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An upstream peripheral device which can be used as a Universal Serial Bus (USB) host, wherein the upstream peripheral device is connected to an external host by a hub, wherein the hub can input data from the external host to the upstream peripheral device, and also output data from the upstream peripheral device to the external host, wherein the upstream peripheral device is connected between the external host and a downstream peripheral device via a USB, and wherein the upstream peripheral device comprises:

an upstream peripheral component, which is connected to the hub so as to output data to the hub and receive data output from the hub, wherein the upstream peripheral component stores basic setting data of the upstream peripheral device;

a virtual downstream peripheral component, which is connected to the hub so as to output data to the hub and receive data output from the hub, wherein the virtual downstream peripheral component stores basic setting data of the downstream peripheral device, and wherein the external host is allowed to retrieve the basic setting data of the downstream peripheral device from the virtual downstream peripheral component when the downstream peripheral device is enabled and connected to the upstream peripheral device; and an internal host, which is respectively connected to the upstream peripheral component, the virtual downstream peripheral component, and the downstream peripheral device, so as to output data from the downstream peripheral device to the virtual downstream peripheral component, and also output data respectively from the upstream peripheral component and the virtual downstream peripheral component to the downstream peripheral device;

wherein operation of the downstream peripheral device is alternatively controlled by the external host and the upstream peripheral device, wherein when the external host serves as the USB host, the external host controls the downstream peripheral device through the hub, the virtual downstream peripheral component, and the internal host, and wherein when the upstream peripheral device serves as the USB host, the upstream peripheral device controls the downstream peripheral device through the internal host.

2. The upstream peripheral device as claimed in claim 1, wherein the hub is configured within the upstream peripheral device.

3. The upstream peripheral device as claimed in claim 1, further comprising a memory, which is respectively connected with the virtual downstream peripheral component and the upstream peripheral component, so as to store data.

4. The upstream peripheral device as claimed in claim 3, wherein the memory is a SDRAM.

5. The upstream peripheral device as claimed in claim 1, wherein the external host acquires the basic setting data of the upstream peripheral device and the downstream peripheral device respectively from the upstream peripheral component and the virtual downstream peripheral component.

6. The upstream peripheral device as claimed in claim 1, wherein when the downstream peripheral device is controlled by the external host, the virtual downstream peripheral component is set at a preparation state, so as to allow the external host to control the downstream peripheral device to operate.

7. The upstream peripheral device as claimed in claim 1, wherein when the downstream peripheral device is controlled by the upstream peripheral device, the virtual downstream peripheral component is set at a busy state, so that the external host is unable to control the downstream peripheral device, and also the upstream peripheral device is able to directly control the downstream peripheral device to operate.

8. The upstream peripheral device as claimed in claim 1, wherein the hub is configured within the external host.

9. The upstream peripheral device as claimed in claim 1, wherein the hub is configured between the external host and the upstream peripheral device.

10. The upstream peripheral device as claimed in claim 1, wherein the external host is a computer host.

11. The upstream peripheral device as claimed in claim 1, wherein the upstream peripheral device is a scanner, and the upstream peripheral component is a scanner component.

12. The upstream peripheral device as claimed in claim 1, wherein the downstream peripheral device is a printer, and the virtual downstream peripheral component is a virtual printer component.

13. The upstream peripheral device as claimed in claim 1, wherein the downstream peripheral device is a digital camera, and the virtual downstream peripheral component is a virtual digital camera component.

14. The upstream peripheral device as claimed in claim 1, wherein the downstream peripheral device is a PDA, and the virtual downstream peripheral component is a virtual PDA component.

15. The upstream peripheral device as claimed in claim 1, wherein the downstream peripheral device is a printer, and the upstream peripheral device is a scanner.

* * * * *